March 27, 1928. 1,663,638
G. J. LUGT
SCAVENGING DEVICE FOR DOUBLE ACTING TWO-STROKE
INTERNAL COMBUSTION ENGINES
Filed Oct. 18, 1924
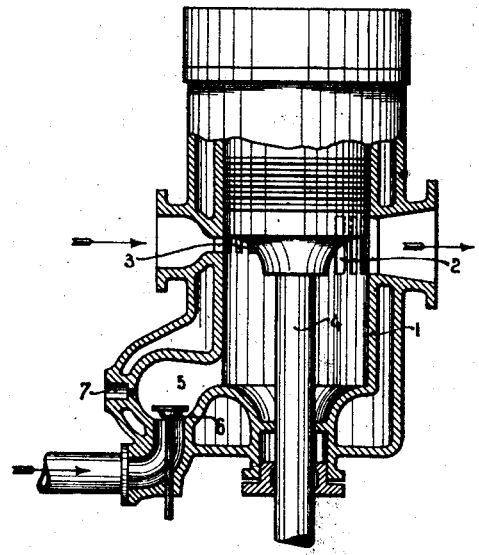
Inventor:
Gerard Johan Lugt
By
Atty.

Patented Mar. 27, 1928.

1,663,638

UNITED STATES PATENT OFFICE.

GERARD JOHAN LUGT, OF AMSTERDAM, NETHERLANDS, ASSIGNOR TO NAAMLOOZE VENNOOTSCHAP NEDERLANDSCHE FABRIEK VAN WERKTUIGEN EN SPOORWEG-MATERIEEL GENAAMD "WERKSPOOR," OF AMSTERDAM, NETHERLANDS, A DUTCH COMPANY.

SCAVENGING DEVICE FOR DOUBLE-ACTING TWO-STROKE INTERNAL-COMBUSTION ENGINES.

Application filed October 18, 1924, Serial No. 744,472, and in the Netherlands February 13, 1924.

My invention relates to scavenging devices for double-acting two-stroke internal combustion engines and has for its primary object to ensure efficient combustion in the cylinder at the crosshead side. With this object in view I provide the cylinder, in the middle region of the lateral wall of which are the outlet and scavenge air ports, with a combustion chamber at the side nearest the crosshead, said chamber being in communication with the cylinder space and being fitted with a scavenging air valve. The chamber may also accommodate the fuel valve and the ignition means if such be required.

In an engine with the new scavenging arrangement the interference of the piston rod with the scavenging action is reduced to a minimum or to nil, and the combustion takes place in pure air, at all events immediately after the ignition. The scavenging air valve in the combustion chamber may be actuated in such coincidence with the movement of the piston that it supplies an after-charge of air. As the scavenging is for the greater part effected by the air injected through the scavenging air port or ports in the cylinder wall, the said valve may be smaller than it would be, were the scavenging air admitted exclusively by way of valves. Consequently, the relatively small combustion chamber can easily accommodate such valve. Since this valve must be actuated while the piston is moving at a high speed, so that the valve motion must be rapid and exact, its small dimensions are of special importance. Moreover, the effect of water cooling on a small valve is relatively greater than that on a larger valve.

In order to prevent misunderstanding as to the scope of the invention, I may explain that it is not broadly new to provide a single-acting two-stroke combustion engine having scavenging air ports adapted to be uncovered by the piston with an additional air-inlet valve in the cylinder cover opposite the crank, said valve being arranged to admit a certain amount of air as an after-charge into the cylinder, after the discharge ports for the combustion gases have been covered by the piston.

Also, it has previously been proposed to fit a double-acting two-stroke engine without scavenging ports with a scavenging valve in a combustion chamber at the crosshead side of the cylinder.

In the accompanying diagrammatic drawing I have illustrated, by way of example only, one embodiment of my invention.

The engine cylinder 1 is provided with discharge ports 2 for the escape of the combustion gases and with scavenging air ports 3. At the side nearest the crosshead, which is driven by the piston rod 4, cylinder 1 is in communication with a combustion chamber 5 and fitted in the wall of this chamber is a scavenging air valve 6. The opening 7 serves to receive a fuel injection valve, the cylinder illustrated being a Diesel engine cylinder.

The operation of the described arrangement will be understood without further explanation.

What I claim is:—

1. In a double-acting two-stroke internal combustion engine, the combination with the engine cylinder having in the middle region of its wall scavenging air ports and outlet ports, and a piston in said cylinder, of a separate combustion chamber laterally projecting from said cylinder at the cross-head end thereof, and a scavenging air-valve opening into said chamber for admitting additional scavenging air, said outlet ports being longitudinally positioned to permit flow of scavenging air therethrough from both the scavenging air ports and the scavenging air-valve opening.

2. In a double-acting two-stroke internal combustion engine, the combination with the engine cylinder having in the middle region of its wall scavenging air ports and outlet ports, and a piston in said cylinder, of a separate combustion chamber laterally projecting from said cylinder at the cross-head end thereof, a scavenging air-valve opening into said chamber for admitting additional scavenging air, said outlet ports being longitudinally positioned to permit flow of scavenging air therethrough from both the scavenging air ports and the scavenging air-valve opening, the said scavenging air-valve being actuated in such coincidence with the movement of said piston as to supply an after-charge of air.

In testimony whereof I affix my signature.

GERARD JOHAN LUGT.